United States Patent
Chattell

(10) Patent No.: US 11,969,684 B2
(45) Date of Patent: Apr. 30, 2024

(54) DUST EXTRACTION UNIT

(71) Applicant: RVT Group Limited, Dartford (GB)

(72) Inventor: Timothy Chattell, Dartford (GB)

(73) Assignee: RVT GROUP LIMITED (GB)

( * ) Notice: Subject to any disclaimer, the term of this patent is extended or adjusted under 35 U.S.C. 154(b) by 519 days.

(21) Appl. No.: 17/077,278

(22) Filed: Oct. 22, 2020

(65) Prior Publication Data

US 2021/0121814 A1    Apr. 29, 2021

(30) Foreign Application Priority Data

Oct. 23, 2019 (EP) ................................. 19204959

(51) Int. Cl.
*B01D 46/00* (2022.01)
*B01D 46/10* (2006.01)
(Continued)

(52) U.S. Cl.
CPC ......... *B01D 46/10* (2013.01); *B01D 46/0005* (2013.01); *B01D 46/0013* (2013.01); *B01D 46/522* (2013.01); *B01D 46/64* (2022.01); *B01D 2267/30* (2013.01); *B01D 2267/70* (2013.01); *B01D 2279/50* (2013.01)

(58) Field of Classification Search
CPC .... B01D 46/10; B01D 46/00; B01D 46/0013; B01D 46/0024; B01D 46/0041; B01D 2273/30
USPC ......... 55/356, 472, 480, 481, 485, 490, 493, 55/506; 96/15, 68, 233, 422; 422/121, 422/122, 177, 186.04
See application file for complete search history.

(56) References Cited

U.S. PATENT DOCUMENTS 4,324,568 A * 4/1982 Wilcox ................ B01D 46/521
                                                                95/286
5,951,725 A * 9/1999 Vross ..................... B01D 46/00
                                                                55/357

(Continued)

FOREIGN PATENT DOCUMENTS

| DE | 202013010666 U1 | 3/2015 |
| EP | 0815919 A2 | 1/1998 |
| ES | 2351335 A1 | 2/2011 |

OTHER PUBLICATIONS

European Search Report in corresponding EP Application No. 19204959.1, dated Feb. 24, 2020, (6 pages).

*Primary Examiner* — Minh Chau T Pham
(74) *Attorney, Agent, or Firm* — Bookoff McAndrews PLLC

(57) ABSTRACT

A dust extraction unit is disclosed including a first and a second air filter removable and mountable within the dust extraction unit and a body defining an air flow path which passes through the first and the second air filters when the first and the second air filters are mounted within the body of the dust extraction unit. The body of the dust extraction unit includes a first portion operable to receive the first air filter and a second portion operable to receive the second air filter. The first and second portions are connected by a hinge so that the first portion is moveable between a first configuration in which the first and second portion define an air flow path through the dust extraction unit and a second configuration which provides access to the portion of the dust extraction unit operable to receive the second air filter.

16 Claims, 10 Drawing Sheets

(51) Int. Cl.
  *B01D 46/52*     (2006.01)
  *B01D 46/64*     (2022.01)

(56) References Cited

U.S. PATENT DOCUMENTS

| | | | | |
|---|---|---|---|---|
| 6,143,048 | A * | 11/2000 | Comproni | B01D 53/38 |
| | | | | 55/482 |
| 6,231,630 | B1 * | 5/2001 | Ernst | B01D 46/0005 |
| | | | | 55/502 |
| 6,607,573 | B1 * | 8/2003 | Chaurushia | B01D 46/30 |
| | | | | 55/467 |
| 6,616,720 | B1 * | 9/2003 | Smith | F24F 8/108 |
| | | | | 55/385.2 |
| 6,623,538 | B2 * | 9/2003 | Thakur | B01D 46/62 |
| | | | | 55/482 |
| 6,979,359 | B2 * | 12/2005 | Laiti | F24F 7/003 |
| | | | | 55/467 |
| 8,388,715 | B2 * | 3/2013 | Franck | F24F 3/044 |
| | | | | 55/482 |
| 8,739,357 | B2 * | 6/2014 | Conrad | A47L 5/36 |
| | | | | 15/327.2 |
| 9,370,740 | B2 * | 6/2016 | Hill | B01D 46/521 |
| 9,669,342 | B2 * | 6/2017 | Lee | B01D 46/62 |
| 9,868,082 | B2 * | 1/2018 | Mathews | B01D 46/64 |
| 10,697,665 | B2 * | 6/2020 | Jung | F24F 8/108 |
| 10,702,435 | B2 * | 7/2020 | Kirschman | F24F 3/00 |
| 11,266,938 | B2 * | 3/2022 | Cheng | B01D 46/10 |
| 2007/0199289 | A1 * | 8/2007 | Bland, Jr. | B01D 46/10 |
| | | | | 55/495 |
| 2010/0115896 | A1 * | 5/2010 | Reid | B08B 15/04 |
| | | | | 55/356 |
| 2014/0020561 | A1 * | 1/2014 | Aery | B01D 46/60 |
| | | | | 55/467 |

\* cited by examiner

DUST EXTRACTION UNIT

CROSS-REFERENCE TO RELATED APPLICATIONS

This patent application claims the benefit of priority to European Patent Application No. 19204959.1, filed on Oct. 23, 2019, the entirety of which is incorporated herein by reference.

The present disclosure relates to a dust extraction unit. More specifically, embodiments of the present disclosure relate to a dust extraction unit for cleaning air in construction sites. Embodiments of the present disclosure are of particular use at construction sites such as construction sites in hospitals or other locations where reducing levels of dust and maintaining a sterile and clean environment when building or maintenance is being undertaken is important.

A variety of dust extraction units for use in construction sites have been developed to remove particulates to produce clean air.

Typically, such dust extraction units comprise a body containing a fan and series of air filters. The filters are arranged within the body of the dust extraction unit, with the filters being designed to trap progressively smaller sizes of particulates. In such a dust extraction unit, dust laden air is drawn in one end of the dust extraction unit by the operation of the fan within the dust extraction unit. This air initially passes through a coarse filter. The coarse filter traps large dust particles present in the air. The air is then passed through a fine air filter which removes finer dust particles from the air before finally passing through a high specification filter to remove further particles before being expelled from the unit.

To maintain a clean air flow, the air filters within a dust extraction unit are periodically removed and cleaned or replaced. As the coarse air filter is exposed to unfiltered air and traps larger particles, this filter requires frequent cleaning or replacement. Conversely the fine air filter and the high specification filters are only exposed to cleaner air from which most particulates have been removed. For this reason, these filters need replacing or cleaning less frequently.

To facilitate cleaning, removal and replacement of the air filters, the body of most industrial dust extraction systems are provided with a removable lid. When the lid is removed, this provides access from above to the air filters mounted within the body of the unit. The air filters can be withdrawn from the dust extraction unit and cleaned or replaced.

When a filter is removed and replaced it is necessary for the dust extraction unit to be tested before being put back into use to ensure that the air filters are accurately positioned within the body and that there are no leaks which enable air passing through the dust extraction unit to by-pass any of the filters. The requirement of accurate positioning and extensive retesting means that replacing the filters in a dust extraction unit is time consuming.

There therefore is a need for an improved dust extraction unit which reduces the need for extensive testing and adjustment of the positioning of air filters within the body of the unit when such air filters are cleaned or replaced.

In accordance with an aspect of the present disclosure a dust extraction unit is provided which comprises a first and a second air filter removable and mountable within the dust extraction unit and a body defining an air flow path operable to receive the first and the second air filters which passes through the first and the second air filters when the first and the second air filters are mounted within the body of the dust extraction unit. The body of the dust extraction unit comprises a first portion operable to receive the first air filter and a second portion operable to receive the second air filter wherein the first and second portions are connected by a hinge so that the first portion is moveable between a first configuration in which the first and second portion define an air flow path through the dust extraction unit and a second configuration which provides access to the portion of the dust extraction unit operable to receive the second air filter. The first and second air filters are releasably clamped within the body of dust extraction unit, the clamping of the air filters is such to form an air-tight seal between the filter and the body of dust extraction unit.

In some embodiments the first and second air filters may each be clamped within the body of the unit by a clamping mechanism comprising a frame having compressible gusset mounted on a surface thereof, wherein when the frame is clamped to the body of the unit, the gusset is compressed between a surface of the frame and a surface of the filter. The frames holding the air filters in position and creating the air tight seal may be clamped to the body of the unit by fixing means which releasably attach the frame to the body of the unit and hold the frame against a filter so as to compress a gusset between a surface of the frame and a surface of the filter.

The present application addresses the problems of the dust extraction systems of the prior art in that rather than slotting the air filters into the body of a dust extraction system from above, the air filters are actively clamped into position in a manner which ensures that air passes through the body of a dust extraction via the air filters. The clamping of the air filters creates an air tight seal between the filter and the body of dust extraction unit and hence the extent to which the positioning of the filters needs to be tested and check is reduced as the filters can be more reliably positioned and held in place.

In some embodiments one or more lugs may be provided which extend from the periphery of the frames and the body of the unit may have one or more channels configured to receive the lugs when the frames are mounted to the body of the unit. The provision of such lugs and channels facilitates accurate positioning of the frame relative to the body of the dust extraction system. Through-holes for receiving a bolt may be provided within the lugs for attaching the frames to the body of the dust extraction unit.

An end panel may be releasably attached to the body of the dust extraction unit wherein removing the end panel provides access to the first air filter. A spigot providing access for air to flow into the interior of the body of the dust extraction unit may be provided in the end panel. The central portion of the end panel may be recessed relative to the periphery of the end panel wherein the extent of the recess is greater than the extent to which the spigot extends beyond the surface of the central portion of the end panel. The periphery of the end panel may be reinforced to be able to support the weight of the dust extraction unit when the dust extraction unit rests on the periphery of the end panel which may help facilitate transportation of the dust extraction unit to a site.

A second gusset may be provided between surfaces of the first and second portions of the dust extraction unit which rest against each other when the first and second portions of the dust extraction unit are in the first configuration. One or more mechanical fasteners such as latches may be provided which hold the first and second portions of the dust extraction unit in the first configuration wherein the one or more mechanical fasteners are operable to compress the second gusset between surfaces of the first and second portions of the dust extraction unit which rest against each other when the first and second portions of the dust extraction unit are in the first configuration.

The air filters may comprise air filters operable to filter different sizes of dust particles from the air. The second air filter may be operable to extract finer particles from the air than the first air filter. In such a system the first air filter may be operable to filter dust particles from air entering the body go the dust extraction unit and the second air filter may be operable to filter air which has passed through the first air filter.

The dust extraction unit may comprise fan mounted within the body of the dust extraction unit wherein the fan is located within the air flow path defined by the body of the dust extraction unit downstream of the first and the second air filters. Alternatively, the dust extraction unit may be configured to be attached to a fan unit for drawing air through the dust extraction unit. In embodiments where a fan is provided a third air filter may be mounted within the dust extraction unit between the second air filter and the fan. In such embodiments wherein the third air filter may be operable to extract finer particles from the air than the first or second air filters.

A control system for controlling the air flow generated by a fan included in the dust extraction unit may be provided. The control system may include an air flow sensor operable to monitor the air flow through the body of the dust extraction unit and the control system may be operable to vary the speed of the fan (on the basis of the detected air flow so as to maintain the air flow at a substantially constant level.

In some embodiments the dust extraction unit may be mounted on casters to facilitate moving the dust extraction unit to a site. In some such embodiments a plurality of bosses may be provided on the outer surface of the dust extraction unit opposite the surface on which the casters are provided, the bosses being configured to receive the casters of a second dust extraction unit to facilitate stacking of multiple dust extraction units.

BRIEF DESCRIPTION OF THE DRAWINGS

The disclosure will now be described, by way of example, with reference to the following drawings, in which.

SPECIFIC EMBODIMENTS

A dust extraction unit in accordance with a first embodiment of the present disclosure will now be described with reference to FIGS. 1-8.

Figure 1:
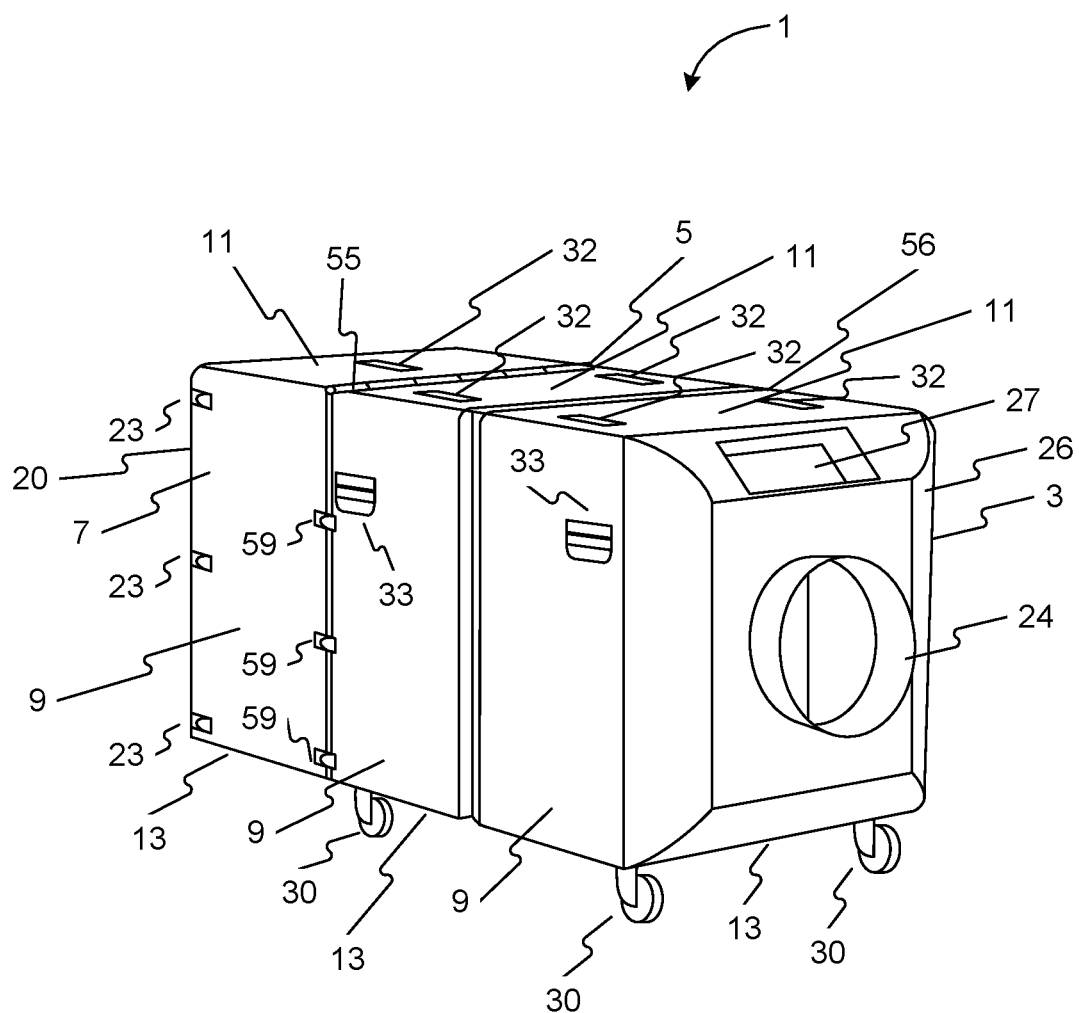
FIG. 1 is a front perspective view of a dust extraction unit in accordance with a first embodiment of the present disclosure.
Figure 2:
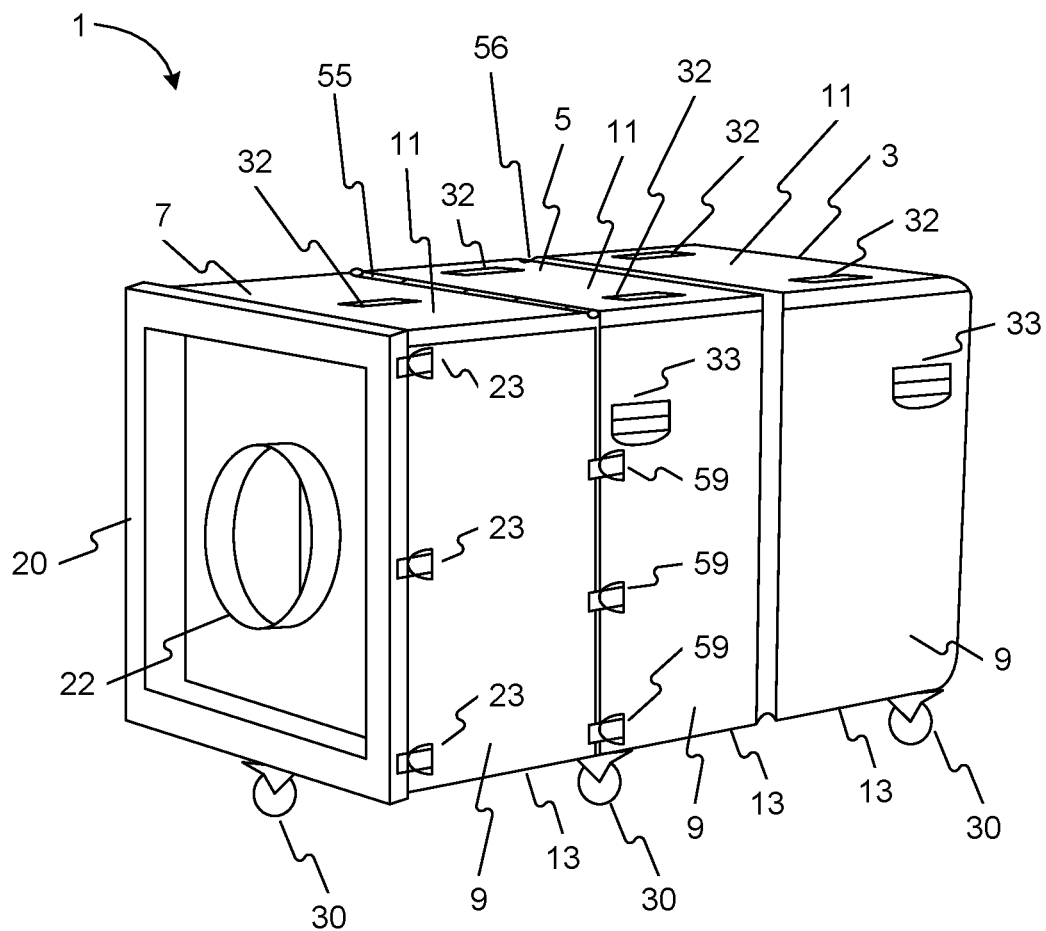
FIG. 2 is a rear perspective view of the dust extraction unit of FIG. 1

Referring first to FIGS. 1 and 2, FIG. 1 is a front perspective view and FIG. 2 is a rear perspective view of a dust extraction unit 1 in accordance with a first embodiment of the present disclosure.

As will be explained in greater detail in this embodiment, the dust extraction unit 1 includes a 3-stage air filtration system. The air filtration system is mounted within a body formed by a front unit 3, middle unit 5 and end unit 7 connected in a series. Each of the units 3,5,7 is in the form of a substantially rectangular housing made of a hard, rigid plastic material such as polypropylene. Each of the units is formed by a pair of side walls 9 and an upper 11 and a lower wall 13. The front unit 3 houses a fan 14 (shown in FIGS. 3 and 4) with an integral high specification air filter 16c such as a H14 HEPA filter. The high specification filter is attached to the front unit 3 by a clamping mechanism which ensures that air which is drawn through the body of the dust extraction unit 1 passes through the high specification filter. The fan 14 can be any suitable type of industrial fan. Suitable industrial fans are fans such that can generate an air flow up to 2500 m$^3$/hr.

Figure 3:
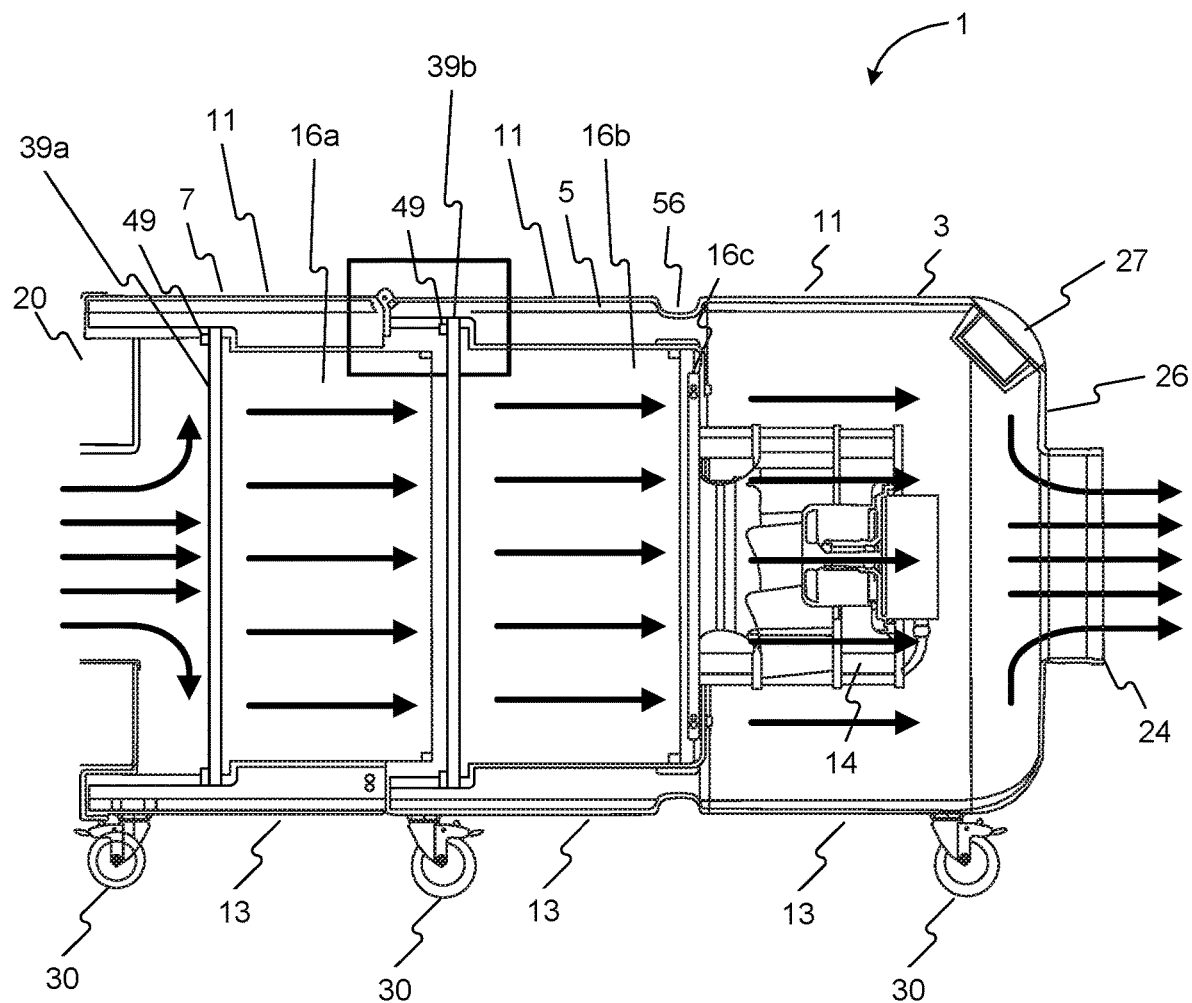
FIG. 3 is a cross-sectional side view of the dust extraction unit of FIG. 1 indicating air flow through the unit.
Figure 4:
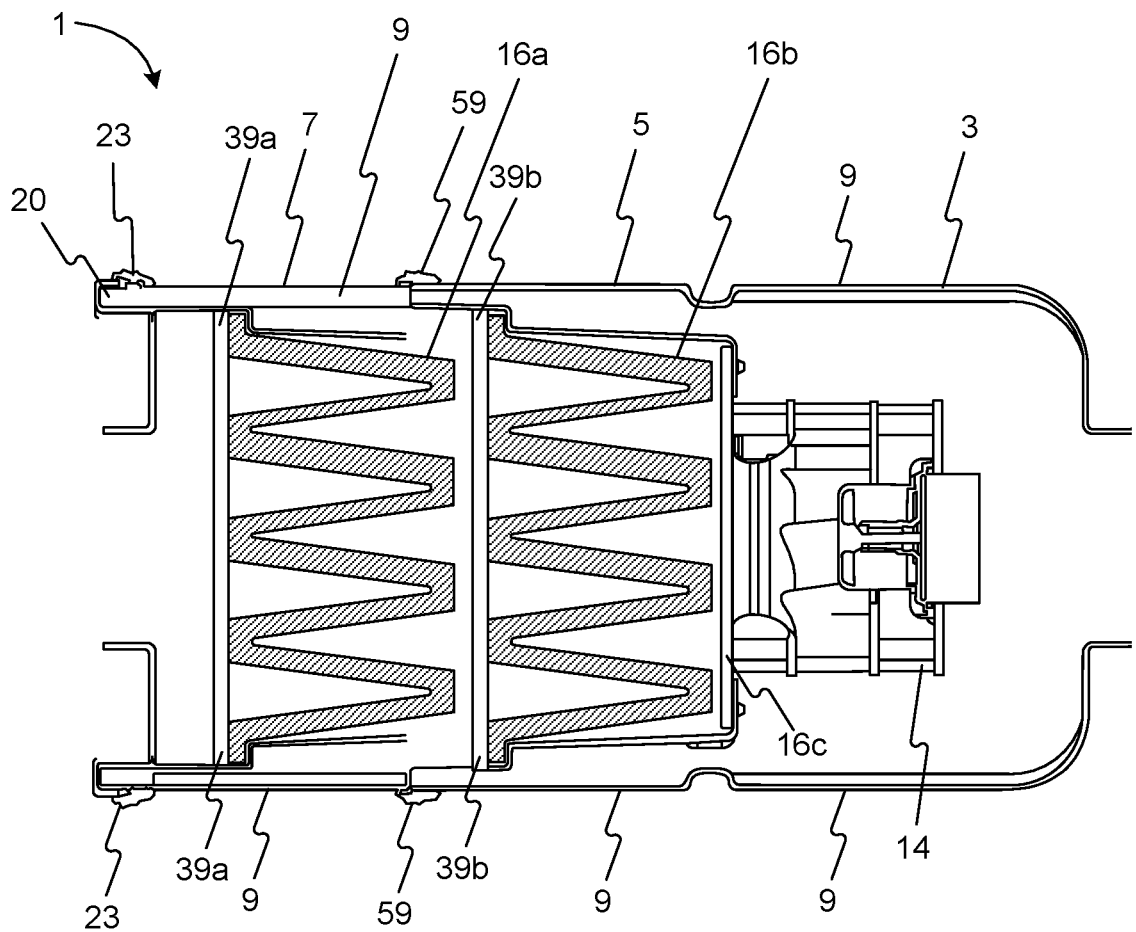
FIG. 4 is a cross-sectional plan view of the dust extraction unit of FIG. 1.

The end and middle units 7,5 are structured to house a washable prefilter 16a and a lower specification filter 16b such as an EU7 filter (shown in FIGS. 3 and 4). These two filters 16a, 16b and the fan 14 are located inside a cavity defined by the walls of the dust extraction unit 1.

As can best be seen in FIG. 2, the end unit 7 has is enclosed by square end panel 20. A spigot 22 is provided in the centre of the end panel 20. The spigot 22 provides access to the interior of the body of the dust extraction unit 1. The end panel is held in place by six latches 23, three each side of the body of the dust extraction unit 1.

In this embodiment, the central portion of the end panel 20 is recessed relative to the periphery of the end panel 20 so that spigot 22 does not extend beyond the periphery of the end panel 20. Additionally, the periphery of the end panel 20 is reinforced. The recess and the reinforcement enables the dust extraction unit 1 to be stored or transported with the dust extraction unit 1 resting on the periphery of the end panel 20. This can be advantageous as the surface area of the end panel is smaller than the foot print of dust extraction unit in the orientation shown in FIGS. 1 and 2 and thus enables the dust extraction unit 1 to be transported to a site when resting on fewer pallets than would be required than if the unit were to be transported to a site in the orientation shown in FIGS. 1 and 2.

Returning to FIG. 1, second spigot 24 is provided in the centre of a front wall 26 enclosing the front unit 3. As with the spigot 22 located at the centre of the end panel 20, the second spigot 24 also provides access to the interior of the body of the dust extraction unit 1. A control panel 27 for the dust extraction unit 1 is located at the top of the front wall 26 of the front unit 3, above the spigot 24. The control panel 27 enables a user to set the desired volume of air to be drawn through the dust extraction unit 1 by the fan 14.

Five casters 30 are provided, which facilitate moving the dust extraction unit 1 into position. The casters 30 extend below the lower wall 13 of the front unit 3, middle unit 5 and end unit 7. A pair of casters 30 extend below the lower wall 13 of the front unit 3. A second pair of casters 30 extend below the lower wall 13 of the middle unit 5. A final caster (which can best be seen in FIG. 2) extends below the lower wall 13 of the end unit 7.

A set of five complementary bosses 32 are provided on the upper walls 11 of the front unit 3, middle unit 5 and end unit 7. Each complementary boss 32 is positioned directly above a corresponding caster 30. The bosses 32 are arranged to receive a caster 30 from another dust extraction unit to facilitate stacking of the dust extraction units when multiple units are to be used at the same site or when the units are to be stored.

A pair of handles 33 (see FIGS. 1 and 2) are provided on the side walls 9 of the front unit 3 and middle unit 5 to facilitate moving and lifting the dust extraction unit 1 and, as will be described relative movement of the end unit 7 and the middle unit 5.

Referring to FIGS. 3 and 4, in use, when the fan 14 is activated, air is drawn in through the first spigot 22 in the end unit 7, into the interior of the dust extraction unit 1. The air passes through the interior of the dust extraction unit 1 and is expelled from the second spigot 24 at the front of the front unit 3. The air flow through the dust extraction unit 1 is illustrated by the arrows shown in FIG. 4.

When air is drawn into the body of the dust extraction unit 1, air first passes through the washable pre-filter 16a, which traps larger dust particles. Once the larger particles have been removed from the airflow by the washable pre-filter 16a, the remaining air then flows through the lower specification air filter 16b which removes smaller particles from the air flow. The air flow then passes through the high specification filter 16c which captures dust particles from the air flow which have not been filtered from the air flow by the washable pre-filter 16a or the lower specification air filter 16b.

As is shown in FIG. 3, a gap separates the washable pre-filter 16a from the interior of the end panel 20 which enables air to be drawn into the body of the dust extraction unit 1 via the first spigot 22 to access the entire surface of the washable pre-filter 16a rather than just the portion of the surface of the pre-filter 16a immediately adjacent the first spigot 22.

As can be seen best in FIG. 4, which is a cross-sectional plan view of the dust extraction unit 1, in plan view the pre-filter 16a and the lower specification air filter 16b have a corrugated appearance having a series of parallel ridges and furrows. This arrangement increases the surface area of the pre-filter 16a and the lower specification air filter 16b which is available to capture dust particles.

To maintain the quality of the dust extraction unit 1, the air filters 16a, 16b, 16c require cleaning and/or replacing on a regular basis. As unfiltered air is filtered by the washable pre-filter 16a, this filter requires frequent cleaning and/or replacement. Conversely, although the high specification filter 16c is arranged to remove smaller dust particles from an air flow than the lower specification air filter 16b, as the high specification filter 16c only filters air which has already been filtered by the washable pre-filter 16a and the lower specification air filter 16b, the high specification filter 16c requires relatively less cleaning and/or replacement. The lower specification air filter 16b which lies between the washable pre-filter 16a and the high specification filter 16c requires intermediate levels of cleaning and/or replacement.

So that the air filters, 16a-16c act to progressively clean air passing through the dust extraction unit 1, it is necessary that the air flow does not by-pass any of the filters 16a-16c. To that end it is necessary that there is an air-tight seal between filters 16a-16c and the body of the dust extraction unit 1. As has been explained maintenance of such an air-tight seal is challenging in conventional dust extraction units where air filters are inserted into the body of a dust extraction unit by opening the top of a dust extraction unit and lowering the air filters into the dust extraction unit. The lid of the dust extraction unit is then closed and the system then needs to be tested to check that all of the air which passes through the unit passes via the filters. If any leaks are detected then the lid must be re-opened, the filters must be adjusted and the system retested.

The applicants have appreciated, that the difficulties of having to place air filters within a dust extraction unit with high accuracy can be avoided if the body of the dust extraction unit 1 is arranged to enable the air filters to be clamped in place, in a manner which creates an air tight seal.

In this embodiment this is achieved by providing a first 39a and a second 39b frame which clamps the washable pre-filter 16a and the lower specification air filter 16b in place.

Figure 5:
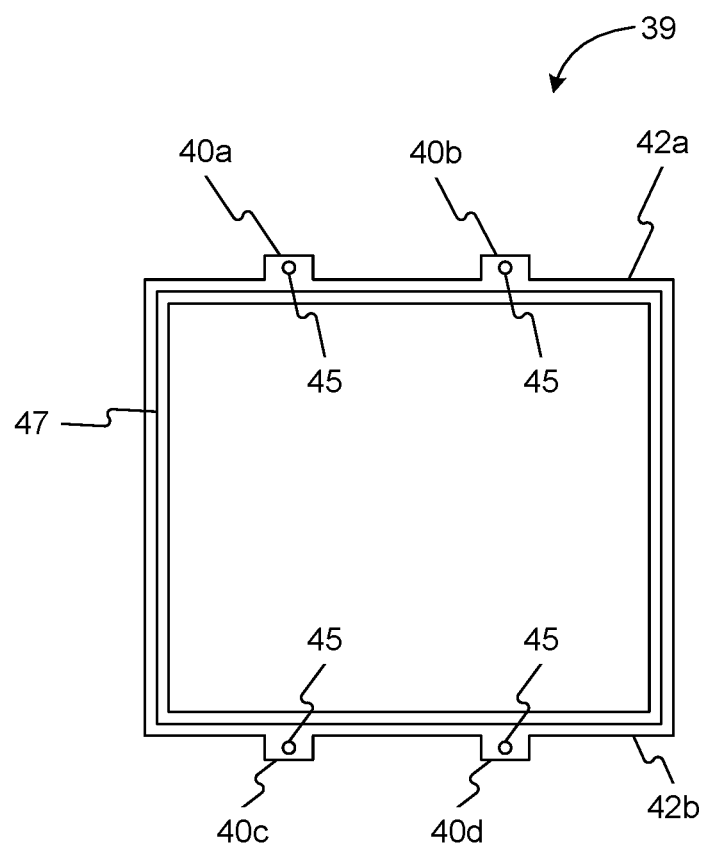
FIG. 5 is a front view of a frame for retaining an air filter within the dust extraction unit of FIG. 1.

FIG. 5 is an exemplary front view of a frame 39. In this embodiment both the first and second frames 39a, 39b are identical. The periphery of each of the frames 39 is square. Four lugs 40a-d extend beyond the periphery of the frame. One pair of lugs 40a, 40b extend beyond the periphery of the upper side 42a of the frame 39. A second pair of lugs 40c, 40d extend beyond the periphery of the lower side 42b of frame 39. Each of the lugs 40a-d is provided with a through hole 45. A gusset 47 in the form of a rubber seal is provided on one surface of the frame 39. The gusset 47 is square in shape and is located in the middle of the surface of the frame 39.

As will be explained, the body of the dust extraction unit 1 is arranged to enable the washable pre-filter 16a and the lower specification filter 16b to be inserted into the body of the dust extraction unit 1 and clamped into position in the direction corresponding to the direction of air flow through the dust extraction unit 1. When an air filter 16b is inserted into the middle unit 5 of the dust extraction unit 1, it is clamped in place by the frame 39.

Figure 6:
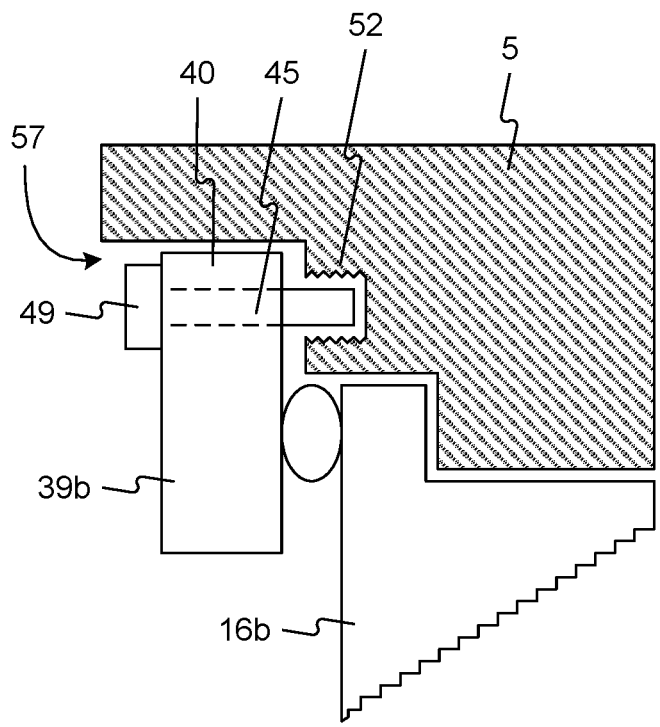
FIG. 6 is an enlarged view of a portion of FIG. 3 indicated by a box in FIG. 3 illustrating the interaction between the frame, the body of the dust extraction unit and an air filter of the dust extraction unit of FIG. 1.

As is shown in FIG. 6 which is an enlarged partial cross-sectional view indicated by the box appearing on FIG. 3 of the clamping of an air filter 16b to the body of the middle unit 5 of the dust extraction unit 1 by a frame 39 bolts 49 are inserted into the through holes 45 of the lugs 40a-d into screw holes 52 provided in the body of the middle unit 5 dust extraction unit 1. Tightening the bolts 49 against the body of the dust extraction unit 1 causes the gusset 47 to be compressed between the frame 39 and the air filter 16b, forming an air-tight seal with the body of the dust extraction unit 1 and thereby ensuring that air passing through the dust extraction unit 1 passes through the air filter 16b mounted in the dust extraction unit 1.

In order to enable the lower specification air filter 16b to be inserted into the middle unit 5, the end unit 7 is attached to the middle unit 5 by a hinge 55 running across the upper surface of the dust extraction unit 1 between the upper walls 11 of the middle unit 5 and the end unit 7. The hinge 55 facilitates rotating of the end unit 7 from the position illustrated in FIG. 1 into the position illustrated in FIG. 7 in which the upper wall 11 of the end unit 7 lies on the upper wall 11 of the middle unit 5.

Figure 7:
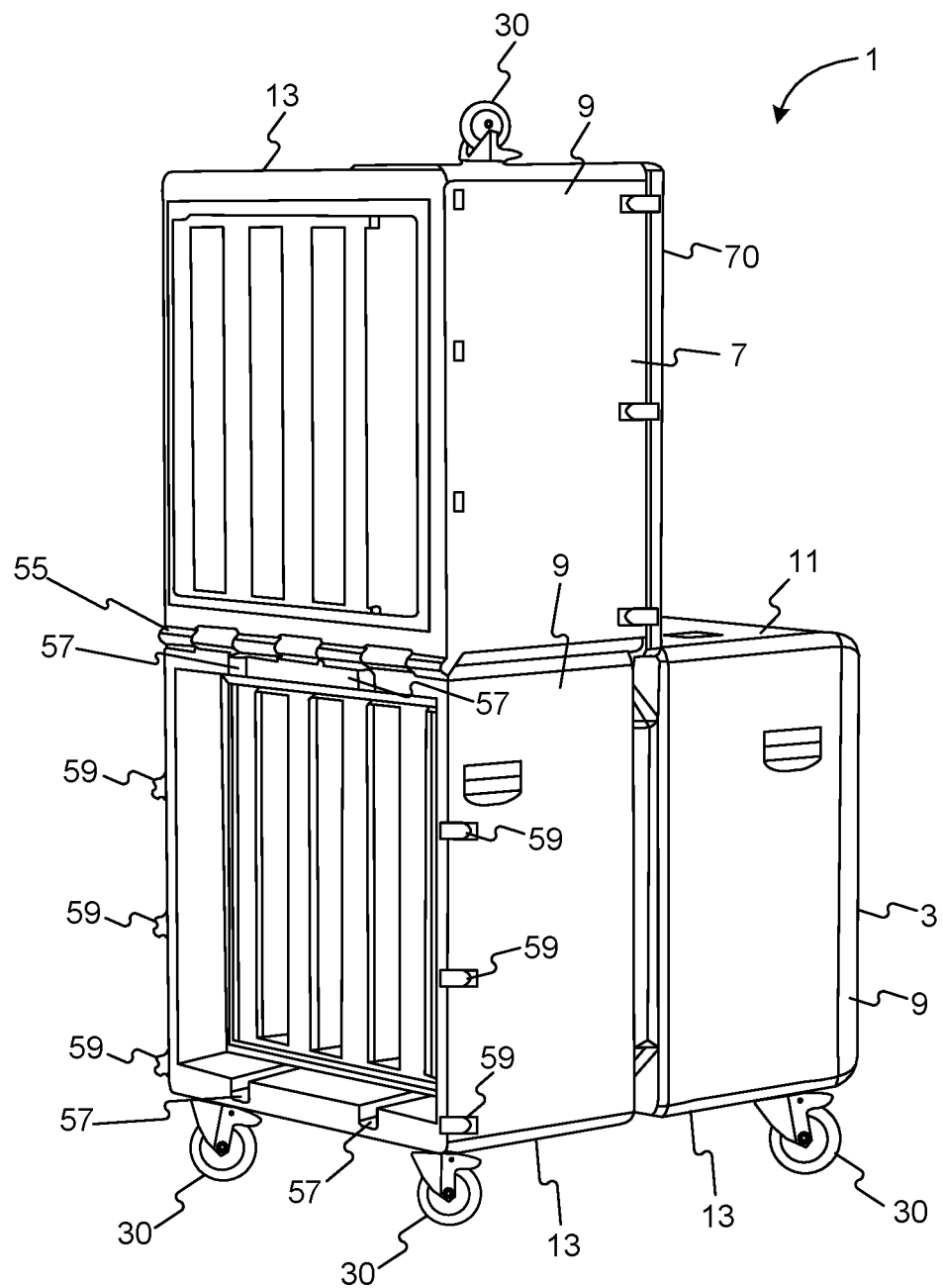
FIG. 7 is a rear perspective view of the dust extraction unit of FIG. 1 in a second configuration.

To facilitate retention of the dust extraction unit 1 in the configuration shown in FIG. 7, a recess 56 (visible in FIGS. 1-3) is provided between the upper walls 11 of the middle 5 and front 3 units which is configured to receive a portion of the periphery of the end panel 20 which protrudes beyond the upper wall 11 of the end unit 7 when the dust extraction unit 1 is in the configuration shown in FIGS. 1-4.

As may be seen in FIG. 7, four channels 57 are provided in the body of the middle unit 5. The channels 57 are complementary to the four lugs 40a-d of the frame 39 and are located inside the lower wall 13 and upper wall 11 of the middle unit 5. The lugs 40a-d and channels 57 enable the frame 39 to be reliably positioned prior to the bolts 49 being inserted into the through holes 45 in the lugs 40 protruding from the frame 39.

As may be best seen in FIGS. 2 and 3, six latches 59 are provided on the side walls 9 of the middle unit 5. These latches 59 facilitate fixing the end unit 7 in the configuration shown in FIGS. 1-4.

Second gusset 60 (visible in FIG. 7) is provided on the surface of the end unit 3 which rests against the middle unit 5 when the dust extraction unit 1 is in the configuration shown in FIGS. 1-4. This gusset 60 is compressed when the dust extraction unit 1 is in the configuration shown in FIGS. 1-4 and the latches 59 for attaching the end unit 7 to the middle unit 5 are engaged and prevents air from entering the dust extraction unit 1 via any gap between the end unit 7 and the middle unit 5 when the end unit 7 and the middle unit 5 are in the configuration shown in FIGS. 1-4.

The washable pre-filter 16a is clamped to the body of the end unit 7 in a similar way to the way in which the lower specification air filter 16b is clamped to the body of the middle unit 5.

Replacement of the washable pre-filter 16a is undertaken with the dust extraction unit 1 in the configuration shown in FIGS. 1-4. In this configuration the latches 23 attaching the end panel 20 to the end unit 7 are released enabling the end panel 20 to be removed. This then provides access to the interior to the washable pre-filter 16a in a similar way to the lower specification air filter 16b can be accessed when the dust extraction unit 1 is in the configuration shown in FIG. 7. As with the middle unit 5, the end unit is also provided with four channels (not shown in the figures) which facilitate sliding a second frame 39a into the end unit 7 into position to clamp the washable pre-filter 16a into position and provide an air tight seal which prevents air passing through the body of the dust extraction unit 1 from by-passing the washable pre-filter 16a.

When either the washable pre-filter 16a or the lower specification air filter 16b is to be cleaned or replaced the dust extraction unit 1 is placed into the configuration which facilitates access to the filter in question, the bolts 49 attaching the frame 39 retaining the filter in place are released, and then the filter is removed. A replacement filter can then be fitted by performing the opposite operation.

Figure 8:
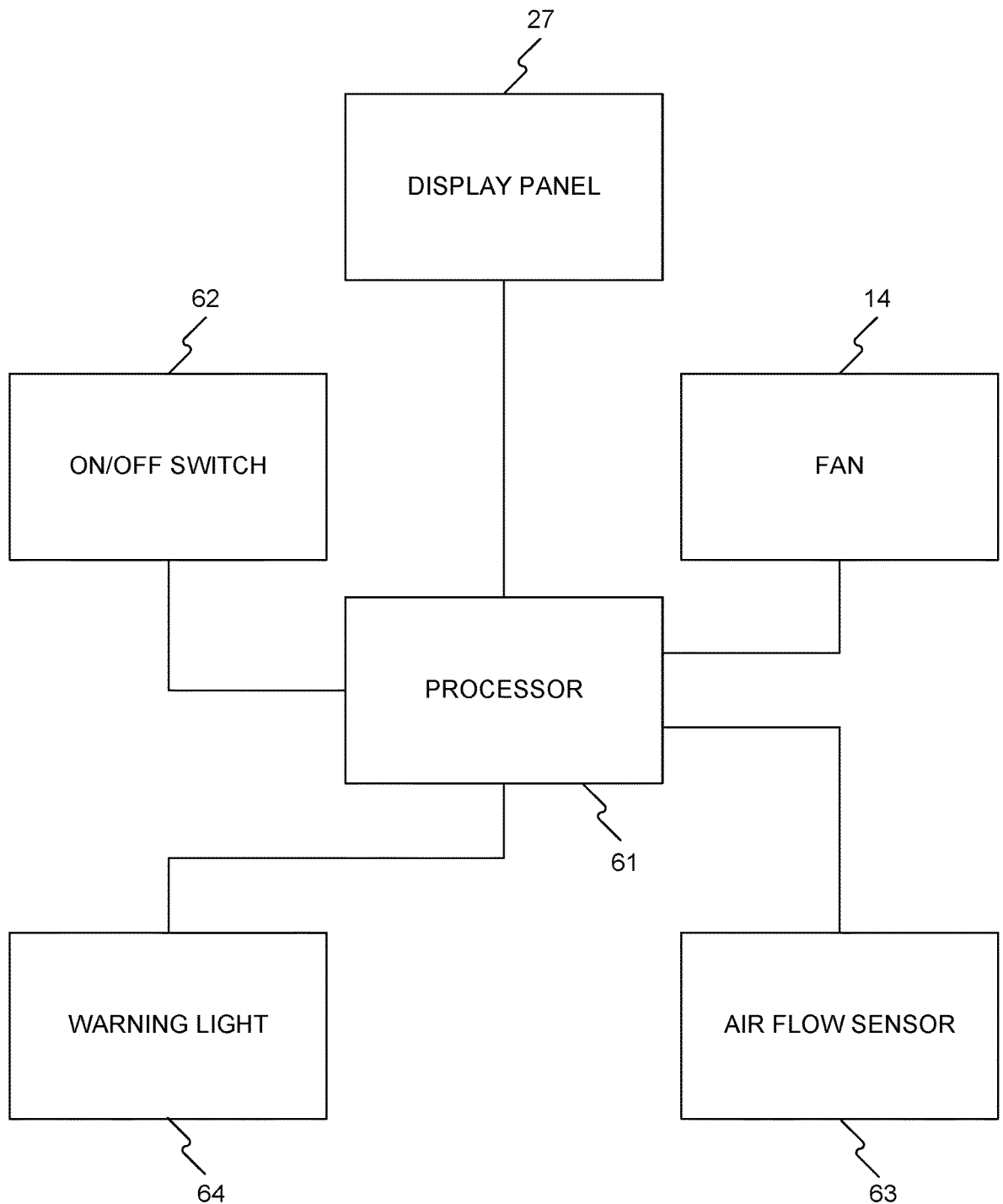
FIG. 8 is a schematic block diagram of the control system of the dust extraction unit of FIG. 1.

FIG. 8 is a schematic illustration of the control system for the dust extraction unit 1. The control system includes a processor 61, an on/off switch 62, an airflow sensor 63 and a warning light 64. The processor 61 is connected to the display panel 27 and the fan 14.

The air flow sensor 63 is configured to monitor the air flow and pressure and a change in air flow. As will be appreciated, as dirt accumulates in the air filters, this increases resistance to air flow through the dust extraction unit 1. In use the processor 61 monitors air flow through the dust extraction unit 1 and can instruct the fan 14 to vary its velocity so that the volume of air passing through the dust extraction unit 1 is kept at a constant level set by instructions input via the control panel 27 as dust and dirt accumulates within the air filters. When the level of dust and dirt exceeds the capacity of the fan 14 to maintain a consistent air flow, the processor activates the warning light 64 to indicate that the air filters require cleaning or replacement.

Figure 9:
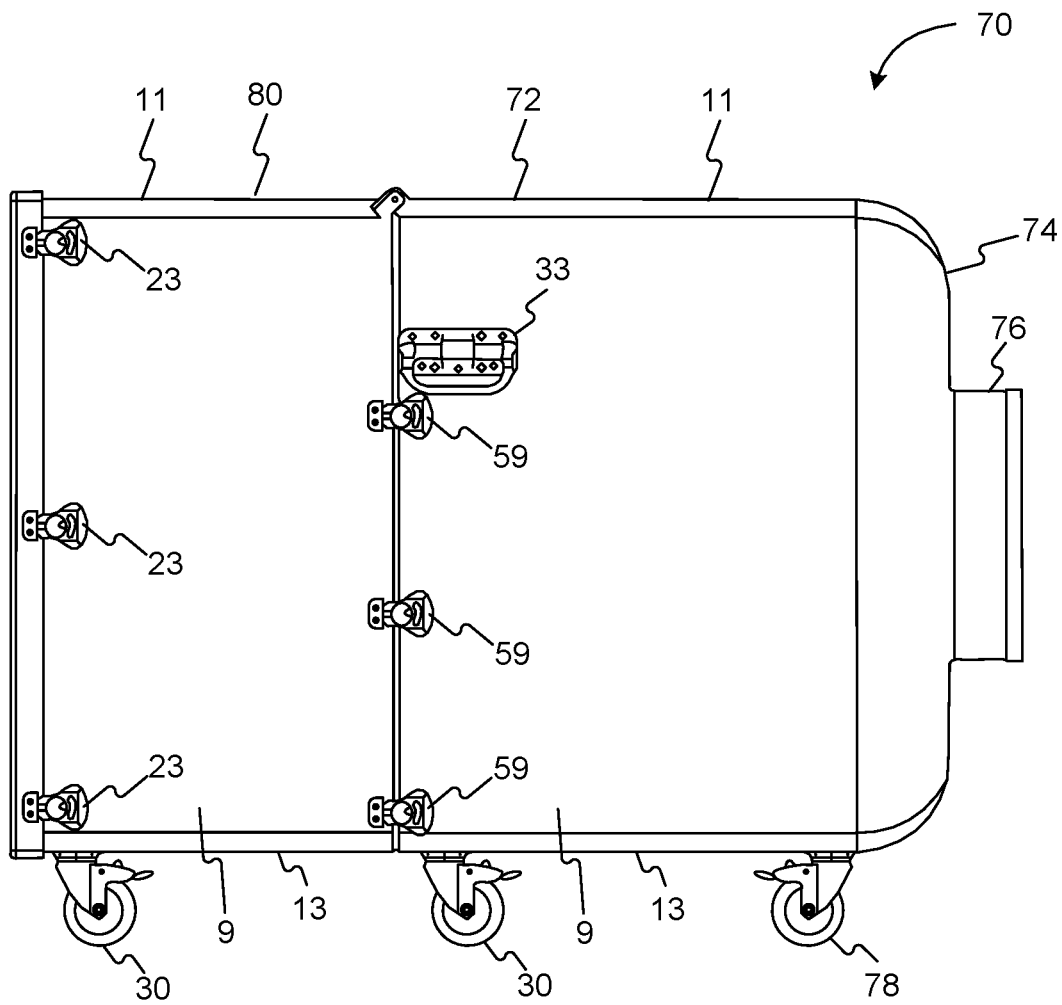
FIG. 9 is side view of a dust extraction unit in accordance with a second embodiment of the present disclosure.
Figure 10:
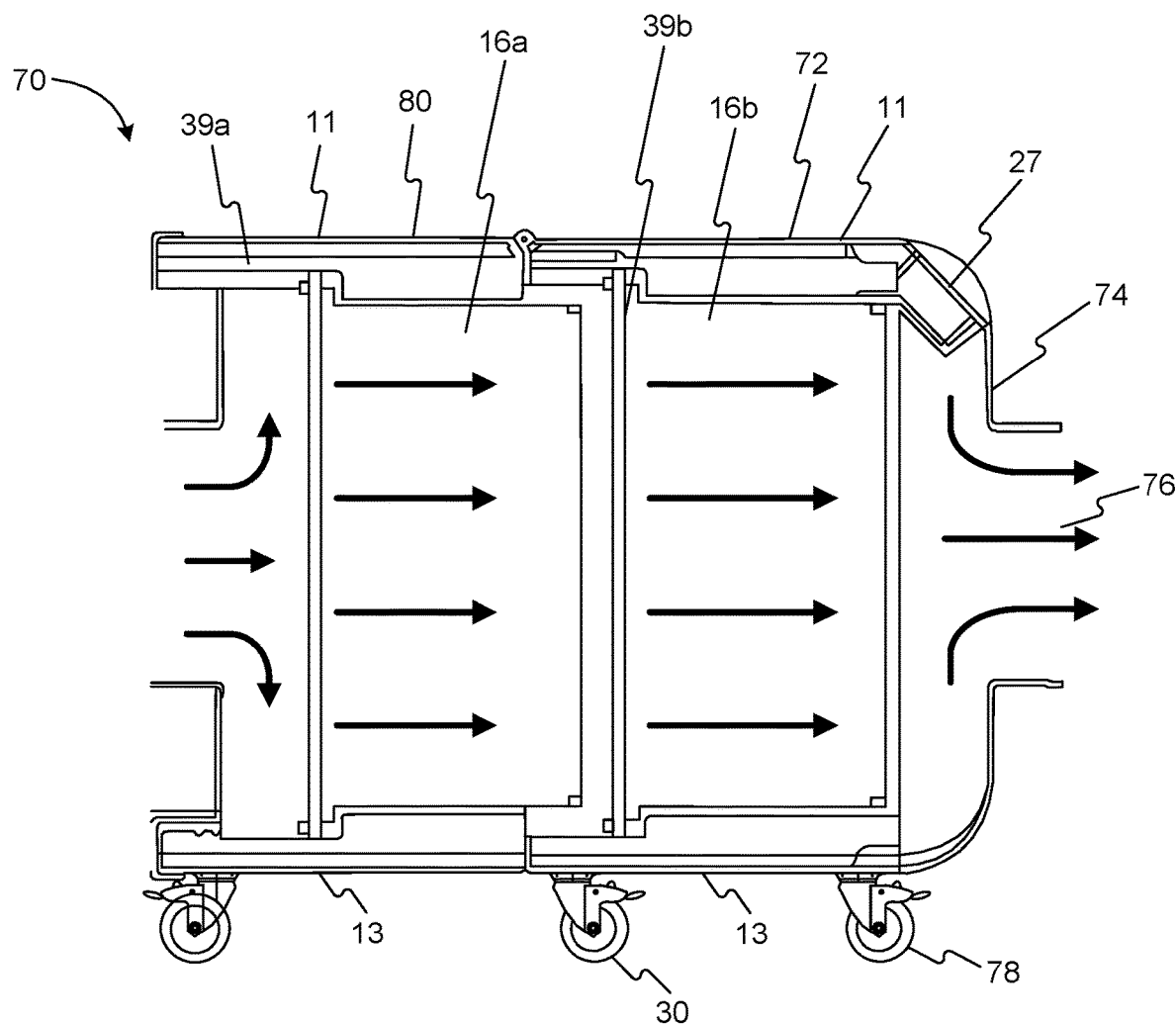
FIG. 10 is a cross-sectional side view of the dust extraction unit of FIG. 9.

A dust extraction unit 70 in accordance with a second embodiment of the present disclosure will now be described with reference to FIGS. 9-10 which are a side view and a cross-sectional side view of a dust extraction unit 70 in accordance with a second embodiment of the present disclosure.

In the first embodiment a dust extraction unit 1 comprising a front unit 3, a middle unit 5 and an end unit 11 where a fan 14 is located in the end unit 11 has been described.

In some embodiments, rather than providing a dust extraction unit 1 which includes a fan 14, a dust extraction unit 70 can be provided which is designed to be attached to a separate fan. In such an embodiment the front unit 3 is omitted and the middle unit 5 is replaced by a modified unit 72 which is enclosed by a front wall 74 from which protrudes a spigot 76 similar to the front wall 26 and spigot 24 of the front unit 3 in the first embodiment. Other than this modification and the provision of an extra pair of casters 78 at the front of modified unit 72 the rest of the modified unit 72 is identical to the middle unit 5 of the first embodiment. The remaining portions of the dust extraction unit 70 are identical to the corresponding portions of the dust extraction unit 1 of the first embodiment and corresponding features have been identified by corresponding reference numerals in FIGS. 9 and 10.

The invention claimed is:

1. A dust extraction unit comprising:
a first and a second air filter removable and mountable within the dust extraction unit;
a body defining an air flow path operable to receive the first and the second air filter, the air flow path passing through the body and through the first and the second air filters when the first and the second air filters are mounted within the body and exiting the dust extraction unit;
the body of the dust extraction unit characterized by:
a first portion operable to receive the first air filter therein, wherein the first portion comprises a first wall forming an external surface of the first portion; and
a second portion operable to receive the second air filter therein, wherein the second portion comprises a second wall forming an external surface of the second portion, and an inner surface defining an interior cavity of the second portion operable to receive the second air filter, wherein the inner surface includes one or more channels extending in line with the air flow path,
wherein the first wall of the first portion and the second wall of the second portion are connected by a hinge,
wherein the hinge transitions the body of the dust extraction unit between a first configuration and a second configuration,
wherein in the first configuration, the first portion and the second portion define the air flow path through the dust extraction unit, and wherein in the second configuration, the first wall of the first portion is disposed on the second wall of the second portion to provide access to the interior cavity of the second portion operable to receive the second air filter, and
wherein the second air filter is releasably clamped within the body of the dust extraction unit by a clamping mechanism including a frame having a compressible gusset, and wherein the frame includes one or more lugs extending from a periphery of the frame, wherein each of the one or more channels is configured to receive a lug of the one or more lugs for mounting the frame to the second portion, the clamping of the second air filter being such to form an air tight seal between the second air filter and the body of dust extraction unit in the first configuration.

2. The dust extraction unit according to claim 1, wherein in the first configuration, the gusset is compressed between a surface of the frame and a surface of the second air filter.

3. The dust extraction unit according to claim 1, wherein the first air filter is releasably clamped within the body of the dust extraction unit by a clamping mechanism including a frame having a compressible gusset, and wherein the frame includes one or more lugs extending from a periphery of the frame and wherein an inner surface defining an interior cavity of the first portion includes one or more channels configured to receive the lugs when the frame is mounted to the body of the unit.

4. The dust extraction unit in accordance with claim 3, wherein each of the one or more lugs are provided with a through hole for receiving a bolt for attaching the frame to the body of the dust extraction unit.

5. The dust extraction unit according to claim 1, further comprising an end panel releasably attached to the body of the dust extraction unit, wherein removing the end panel provides access to the first air filter, wherein a spigot providing access for air to flow into the interior of the body of the dust extraction unit is located in the end panel.

6. The dust extraction unit in accordance with claim 5, wherein a central portion of the end panel is recessed relative to a periphery of the end panel wherein an extent of the recess is greater than an extent to which the spigot extends beyond a surface of the central portion of the end panel.

7. The dust extraction unit in accordance with claim 6, wherein the periphery of the end panel is reinforced to be able to support the weight of the dust extraction unit when the dust extraction unit rests on the periphery of the end panel.

8. The dust extraction unit in accordance with claim 1, wherein a second gusset is located between surfaces of the first and the second portions of the dust extraction unit which rest against each other when the first and the second portions of the dust extraction unit are in the first configuration.

9. The dust extraction unit in accordance with claim 8, wherein one or more mechanical fasteners are configured to hold the first and the second portions of the dust extraction unit in the first configuration wherein the one or more mechanical fasteners are operable to compress the second gusset between surfaces of the first and the second portions of the dust extraction unit which rest against each other when the first and the second portions of the dust extraction unit are in the first configuration.

10. The dust extraction unit in accordance with claim 1, wherein the first air filter is operable to filter dust particles from air entering the body of the dust extraction unit and the second air filter is operable to filter air which has passed through the first air filter.

11. The dust extraction unit in accordance with claim 1, further comprising a fan mounted within the body of the dust extraction unit wherein the fan is located within the air flow path defined by the body of the dust extraction unit downstream of the first and the second air filters.

12. The dust extraction unit in accordance with claim 11, wherein a third air filter is mounted within the dust extraction unit between the second air filter and the fan.

13. The dust extraction unit in accordance with claim 11, further comprising a control system for controlling the air flow generated by the fan, wherein the control system includes an air flow sensor operable to monitor the air flow through the body of the dust extraction unit and the control system is operable to vary a speed of the fan based at least in part on the detected air flow so as to maintain the air flow at a substantially constant level.

14. The dust extraction unit in accordance with claim 1, wherein the dust extraction unit is mounted on casters wherein a plurality of bosses are located on an outer surface of the dust extraction unit opposite a surface on which the casters are located, the bosses being configured to receive the casters of a second dust extraction unit to facilitate stacking the dust extraction units.

15. The dust extraction unit of claim 1, wherein the frame is separable from the body of the unit.

16. The dust extraction unit of claim 5, wherein the second wall of the second portion includes a recess operable to receive a protruding portion of the end panel.

\* \* \* \* \*